United States Patent [19]

Nakamura

[11] 4,249,162

[45] Feb. 3, 1981

[54] REMOTE CONTROL SWITCH ASSEMBLY

[75] Inventor: Takeshi Nakamura, Uji, Japan

[73] Assignee: Murata Manufacturing Co., Ltd., Japan

[21] Appl. No.: 29,652

[22] Filed: Apr. 13, 1979

[30] Foreign Application Priority Data

Apr. 19, 1978 [JP] Japan ............................ 53-51503[U]

[51] Int. Cl.$^3$ ........................ H04Q 9/10; H04B 11/00

[52] U.S. Cl. ............................... 340/148; 340/171 A; 340/695

[58] Field of Search ............ 340/148, 171 R, 310 CP, 340/171 A, 695

[56] References Cited

U.S. PATENT DOCUMENTS

| | | | |
|---|---|---|---|
| 3,484,775 | 12/1969 | Cline | 340/310 CP |
| 3,590,271 | 6/1971 | Peters | 340/310 CP |
| 3,798,600 | 3/1974 | Saikaishi et al. | 340/148 |
| 3,879,709 | 4/1975 | Yukawa | 340/171 R |
| 3,970,987 | 7/1976 | Kolm | 340/310 CP |

*Primary Examiner*—Donald J. Yusko
*Attorney, Agent, or Firm*—Ostrolenk, Faber, Gerb & Soffen

[57] ABSTRACT

A remote control switch assembly for controlling a lamp includes a signal generating unit for generating and radiating a supersonic wave signal carrying a control signal, a signal receiving unit for receiving the radiated signal. The signal receiving unit which is incorporated in a switch box for the lamp includes at least one relay switch actuated when the control signal is included in the supersonic wave signal.

11 Claims, 4 Drawing Figures

REMOTE CONTROL SWITCH ASSEMBLY

BACKGROUND OF THE INVENTION

The present invention relates to a remote control switch assembly including a signal generating unit and a signal receiving unit coupled to electric appliances such as lamps, for controlling the electric appliances when the signal generating unit (provided independently of and remote from the signal receiving unit) is manipulated.

According to the conventional remote control system for controlling the supply of electric power to an electric appliance such as a lamp by means of wireless transmission of signals such as ultrasonic waves, the signal receiving unit is accommodated either (i) inside the electric appliance or (ii) between the electric appliance and a source of power (such as a commercial AC source). In the former case (i), it is necessary to design the electric appliance to be capable of being controlled by a remote switch. In the latter case (ii), it is necessary to supply additional wiring between the electric appliance and the receiver unit and also between the receiver unit and the AC source. In addition to the above disadvantages, there has been such a disadvantages, that the manually operable switch for turning the appliance on and off cannot be operated by means of the remote switch.

SUMMARY OF THE INVENTION

Accordingly, a primary object of the present invention is to provide a remote control switch assembly which can be simply employed with any electric appliance.

Another object of the present invention is to provide a remote control switch assembly of the above described type which is simple in construction and can readily be manufactured at low cost.

In accomplishing these and other objects, there is provided a remote control switch assembly including a switch box and a switch means installed within the switch box for selectively opening and closing the electric circuit between the electric appliance and the source of electric power. According to the present invention, the switch means includes at least one automated switch electrically inserted in the circuit between the electric appliance and the electric power source. A signal generating unit has at least one oscillator means for producing a first signal, which the signal generating means is adapted to radiate acoustically. Operable in association with the signal generating unit is a signal receiving unit for receiving the radiated control signal. The radiated signal is utilized to control the automated switch so as to selectively open and close the electric circuit between the electric appliance and the electric power source one at a time. The signal receiving unit is accommodated within the switch box.

According to a preferred embodiment of the present invention, the signal receiving unit includes a microphone for receiving the radiated signal and for converting the received signal into an electric signal; a detector means coupled to the microphone for detecting the first signal in the radiated ultrasonic wave signal; a tuning fork coupled to the detector means for producing the control signal when the detected first signal is applied to the tuning fork; and a relay responsive to the control signal for opening and closing the automated switch.

In accordance with the present invention, a remote control switch assembly is provided to connect and disconnect an electrical appliance to a source of electric power. The remote control switch assembly comprises:

a manually operable switch coupled between said appliance and said power source and switchable between an OFF and an ON state;

a remote control switch coupled in parallel with said manually operable switch and between said appliance and said power source, said remote control switch being switchable between an OFF and an ON state, said remote control switch and said manually operable switch being connected to said appliance and said power source in such a manner that said appliance is connected to said power source whenever either of said switches is in its ON state and is disconnected from said power source whenever both of said switches are in their OFF state;

signal receiving means for switching said remote control switch from that one of said OFF and ON states said remote control switch was last in into the other of said OFF and ON states each time said signal receiving means receives an acoustically radiated control signal;

battery means for powering said signal receiving means; and means for coupling said power source to said battery means so as to charge said battery means whenever both said manually operable switch and said remote control switch are in said OFF state.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
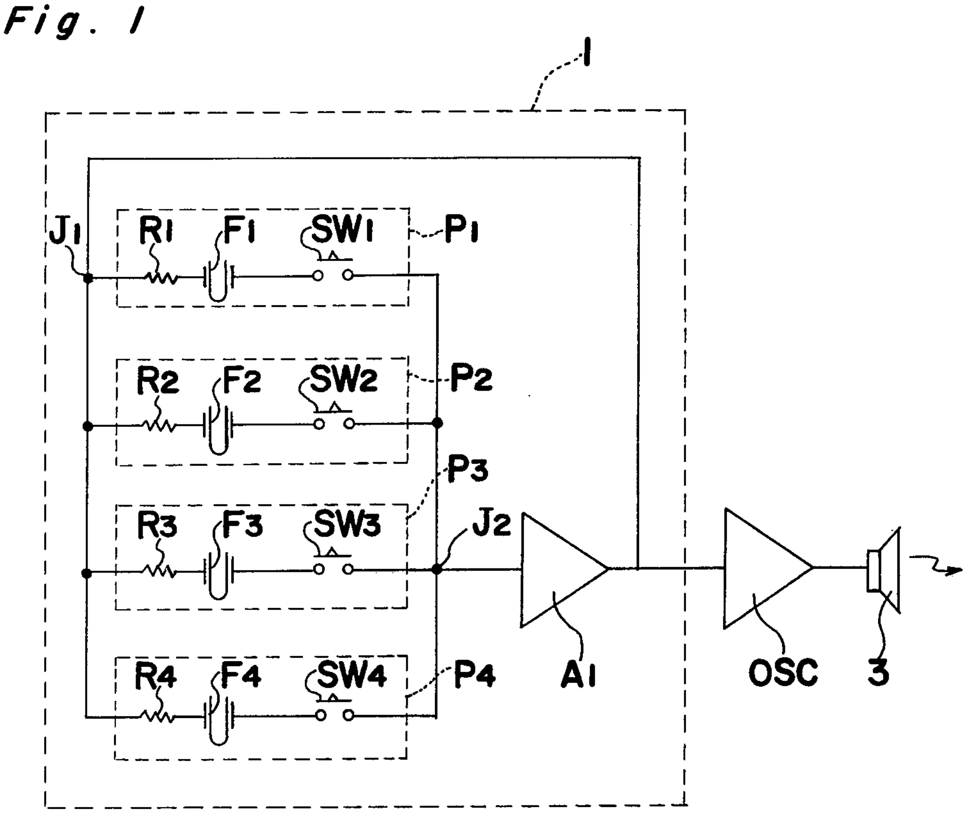
FIG. 1 is a circuit diagram of a signal generating unit assembled in accordance with the present invention.

Before the description of the present invention proceeds, it is to be noted that like parts are designated by like reference numerals throughout the accompanying drawings.

Referring to FIG. 1, a signal generating unit 1 according to the present invention comprises one or more, for example, four, piezoelectric tuning fork oscillator arrangements P1, P2, P3 and P4, which are connected in parallel to each other between common junctions J1 and J2 and each of which controls a switch in a different appliance. The first piezoelectric tuning fork oscillator arrangement P1 includes a resistor R1, a tuning fork oscillator F1 and a manually operable switch SW1 which are connected in series. Similarly, the second piezoelectric tuning fork oscillator arrangement P2 includes a resistor R2, a tuning fork oscillator F2 and switch SW2; the third piezoelectric tuning fork oscillator arrangement P3 includes a resistor R3, a tuning fork oscillator F3 and switch SW3; and the fourth piezoelectric tuning fork oscillator arrangement P4 includes a resistor R4, a tuning fork oscillator F4 and switch SW4. It is to be noted that the tuning fork oscillators F1, F2, F3 and F4 have different natural frequencies f1, f2, f3 and f4.

The signal generating unit 1 further comprises an amplifier A1 which has an input connected to the common junction J2 while the output is connected to the common junction J1. When one of the switches SW1, SW2, SW3 and SW4, e.g. switch SW1, is closed, the resulting closed circuit established through the resister R1, tuning fork F1, switch SW1, and amplifier A1 causes the tuning fork oscillator F1 to generate a first signal having a frequency f1. The first signal is taken out from the amplifier A1 and is applied to a ultrasonic wave oscillator OSC which generates a carrier wave having a higher frequency than the frequency of the control signal produced by any of the tuning forks. The ultrasonic wave, that is, the carrier wave, generated by the oscillator OSC is modulated by the control signal obtained from any one of the oscillator arrangements. According to the preferred embodiment of the present invention, the carrier wave is frequency modulated by the control signal. Accordingly, the oscillator OSC produces an FM signal which is applied to an ultrasonic wave speaker 3. The speaker 3 radiates ultrasonic wave signal therefrom.

Figure 2:
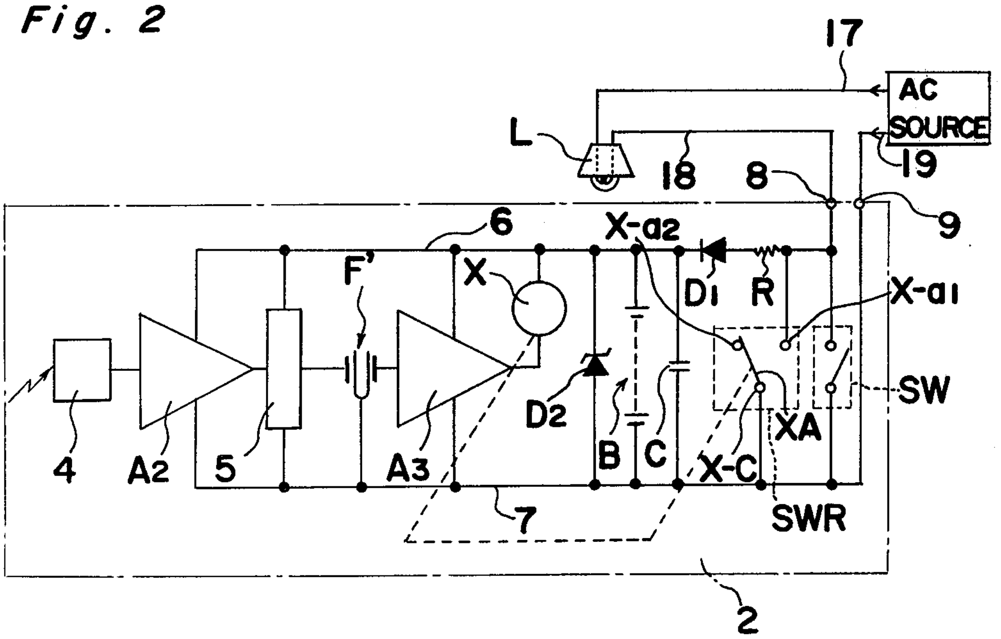
FIG. 2 is a circuit diagram of a signal receiving unit assembled in accordance with the present invention.

Referring to FIG. 2, a signal receiving unit 2 according to the present invention comprises a microphone 4 for receiving ultrasonic wave radiated from the speaker 3, an amplifier A2 connected to the microphone 4 for amplifying the received signal, an FM detector 5 connected to the amplifier A2 for detecting the FM signal and for producing the control signal, a tuning fork F′ connected to the FM detector 5 for regenerating the detected control signal when the detected control signal has the same frequency as the natural frequency inherent in the tuning fork F′, and an actuating circuit A3 connected to the tuning fork F′ for actuating a relay X to be described later. It is preferable to employ a pulse counting type detector for the FM detector 5. The actuating circuit A3 is preferably constituted by a rectifier (not shown) for rectifying the control signal, and a comparator (not shown) for inverting the output level when the output exceeds a predetermined level. These elements A2, 5 and A3 described above are connected in parallel to a battery B through a positive lead wire 6 and a negative lead wire 7, as well as in series to each other. The output of the actuating circuit A3 is connected to one side of the relay X which actuates a relay switch SWR in a manner that will be described later. The other side of the relay X is connected to the positive lead wire 6. Connected across the battery B are a Zener diode D2 and a smoothing capacitor C in parallel with the diode D2. The positive side of the battery B is connected to a series-connected diode D1 and resistor R and further to a terminal 8. On the other hand, the negative side of the battery B is connected to a second terminal 9. The diode D1 and the smoothing capacitor C are provided for rectifying the AC voltage and for charging the battery B whereas the Zener diode D2 is provided for preventing the battery B from being overcharged. Connected between the terminals 8 and 9 is a parallel circuit including the relay switch SWR, actuated by the relay X, and a manually operable switch SW. The relay switch SWR includes a common terminal X-C which is connected to terminal 9, selecting terminals X-a1 and X-a2 and connecting arm XA extending from the common terminal X-C for the connection with either one of the terminals X-a1 and X-a2. The terminal X-a1 is connected to terminal 8 while the terminal X-a2 is free from any electrical connection. Therefore, when the arm XA bridges between the terminals X-C and X-a2, the switch SWR is in an OFF state whereas when the arm XA bridges between the terminals X-C and X-a1, the switch SWR is in an ON state. Since the relay X is of a lock type (such as that manufactured by Omron Tateisi Electronics Co. with the product number MR-1005M), a temporary energization of the relay X causes the switch SWR to assume one of the states, for example, the OFF state. The switch SWR is maintained in the OFF state even after the de-energization of the relay X. Thereafter, a temporary energization of the relay X causes the switch SWR to assume the other of the states, that is, the ON state, and the switch SWR is maintained in the ON state even after the de-energization of the relay X. In other words, each energization of the relay X alternately turns the switch SWR on and off. The terminals 8 and 9 are connected to lead wire 18 which leads to one power input of an electric appliance such as lamp L and a lead wire 19 which lead to one output of an AC power source. The other output of the AC power source is connected through a lead wire 17 to the other power input of the lamp L.

The operation of the signal receiving unit 2 is described hereinbelow.

When neither one of the switches SWR and SW is ON, a very small amount of current flows through the lamp L, the terminal 8, diode D1, capacitor C, terminal 9 and the lead wire 19, producing a rectified voltage across the capacitor C. This rectified voltage is applied across the battery B to charge it. The Zener diode D2 is connected across the battery B to prevent the battery B from being over-charged. The voltage across the battery B is applied to the elements A2, 5, X and A3. When the microphone 4 receives the FM modulated ultrasonic wave signal, this wave signal is amplified in the amplifier A2 and is demodulated in the detector 5. Therefore, the detector 5 produces a control signal which is similar to or identical to the signal produced by the tuning fork F1, F2, F3 or F4. If the natural frequency of the tuning fork F′ coincides with the frequency of the detected control signal, the control signal is applied to the amplifier A3, which produces an actuating signal to the relay X. When the relay X is energized by the actuating signal, the relay switch SWR which has been in the OFF state as shown in FIG. 2 is caused to assume the ON state, substantially connecting the terminals 8 and 9. Accordingly, the lamp L is supplied with the AC commercial power form the lines 17 and 19. Even after the de-energization of the relay X as a result of the discontinuation of the ultrasonic wave signal from unit 1, the relay switch SWR is maintained in the ON state. Thereafter, when the same FM modulated ultrasonic wave signal as described above is transmitted to the receiving unit 2, the tuning fork F′ again allows the signal to pass therethrough to energize the relay X. This time, upon energization of the relay X, the relay switch SWR, which has been in the ON state, is caused to assume the OFF state, substantially disconnecting the terminals 8 and 9. Accordingly, the lamp L is turned off. The lamp L is maintained off until the relay X is again energized by a subsequent signal from unit 1. The manually operable switch SW can be operated to control the lamp L independently of the remote control of the invention.

Figure 3:
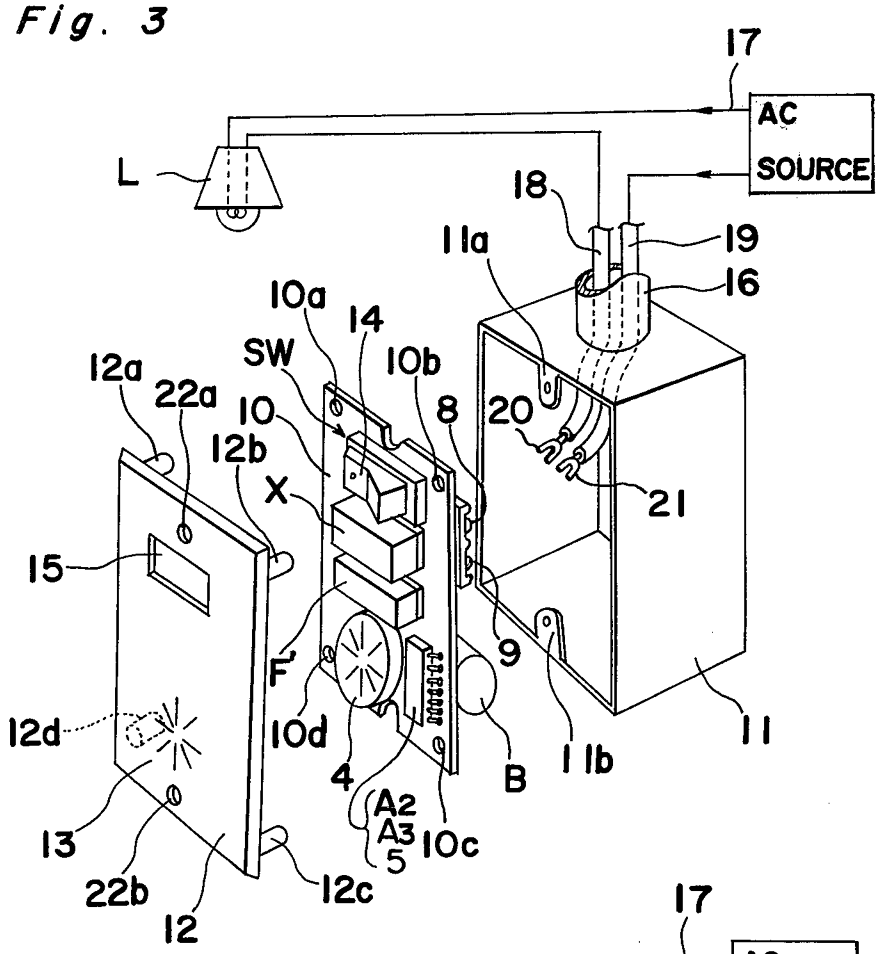
FIG. 3 is a perspective view of a switch box for an electric appliance showing a manner in which the signal receiving unit can be installed in the switch box in accordance with the present invention.

Referring to FIG. 3, there is shown an arrangement in which the receiving unit 2 according to the present invention is accommodated in a switch box 11. The switch box 11, of a rectangular container-like shape, has a hole to which is connected a pipe 16 for guiding the wires 18 and 19 into the switch box 11. The ends of the wires 18 and 19 located inside the switch box 11 are preferably provided with terminal lugs 20 and 21. The wire 19 leads to the commercial AC source while the wire 18 leads to the lamp L. On the upper and lower edges of the open side of the box 11 are formed tabs 11*a* and 11*b*, each of which has a threaded opening for receiving a screw therein. The signal receiving unit 2 shown in FIG. 2 is assembled on a rectangular printed circuit board 10 having four openings 10*a*, 10*b*, 10*c* and 10*d* formed at the four corners, respectively. In FIG. 3, provided on the surface of the circuit board 10 facing the box 11 are the rechargeable battery B, terminals 8 and 9, which can be connected to the lugs 20 and 21, and electric components such as capacitor C, resistor R, diodes D1 and D2, etc. On the other hand, provided on the other surface of the circuit board 10 are the microphone 4, amplifier A2, tuning fork F', relay switch X, amplifier A3, detector 5 and manual operating switch SW. Manual switch SW has a projection 14 capable of being operated by an operator. A cover panel 12 having a rectangular shape and being of a size slightly larger than the opening of the box 11 is provided to cover the front of the circuit board 10. The cover panel 12 may be formed by press or in a similar manner and has four parallel cylindrical legs 12*a*, 12*b*, 12*c* and 12*d* extending from the four corners of the panel 12. Each of the legs has a threaded axial opening and is located so that the axial openings can be aligned with holes 10*a*–10*d* in the corners of the circuit board 10. A rectangular opening 15 is formed to expose the projection 14, and a pair of circular openings 22*a* and 22*b* are formed at the upper and lower edge portions in locations corresponding to the holes in tabs 11*a* and 11*b*. Slits 13 are formed in the panel 12 to admit the ultrasonic wave.

The attachment of the panel 12 to the circuit board 10 is effected by the use of four screws (not shown) inserted from the side of the circuit board 10 facing the box 11 through the respective openings 10*a*, 10*b*, 10*c* and 10*d* into the legs 12*a*, 12*b*, 12*c* and 12*d*. After the lugs 20 and 21 have been connected to the terminals 8 and 9, the circuit board 10 is housed inside the box 11, and the panel 12 closes the box 11. The panel 12 is firmly secured by the use of two screws (not shown) inserted from the outside of the box 11 through the respective openings 22*a* and 22*b* into the threaded openings formed in the tabs 11*a* and 11*b*. According to the present invention, the receiving unit 2 can be easily accommodated in the switch box 11. Therefore, when it is required to control a lamp by a remote switch, all that is necessary is to replace the manual switch of the lamp with the receiving unit 2.

According to the above described embodiment, the manual switch SW and the relay switch SWR are operated independently from each other, so that it is necessary to maintain the manual switch SW OFF when the lamp L is to be controlled by the remote switch, and to maintain the relay switch SWR OFF when the lamp L is to be controlled by the manual switch SW.

Figure 4:
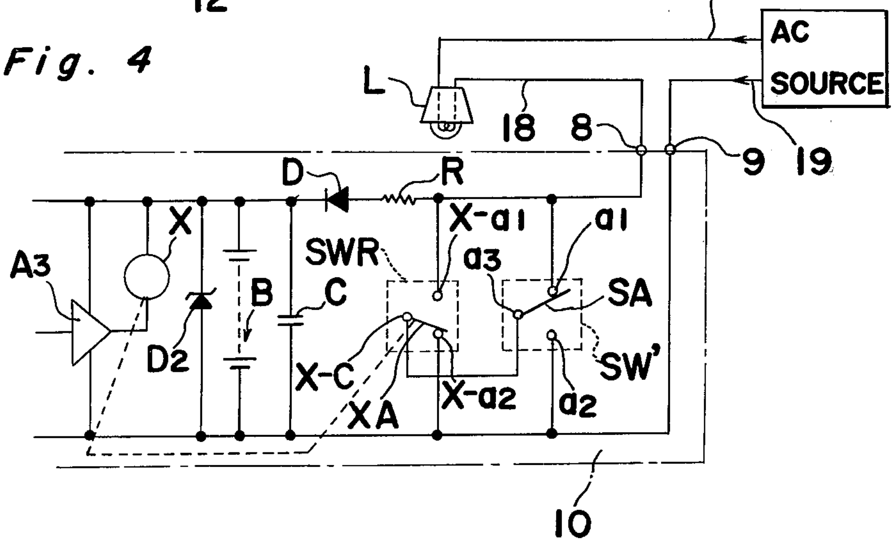
FIG. 4 is a circuit diagram showing a part of the circuit shown in FIG. 2 and particularly showing a modification of the switch arrangement.

Referring to FIG. 4, there is shown a circuit according to another embodiment of the invention. In this embodiment, the manual switch SW' and the relay switch SWR are in association with each other. More specifically, the manual switch SW' includes three terminals a1, a2 and a3. Terminal a1 is connected to terminal 8, terminal a2 is connected to terminal 9, and terminal a3 is connected to the common terminal X-C of the relay switch SWR. A connecting arm SA extends from terminal a3 for connecting terminal a3 alternately with terminals a1 and a2. Terminals X-a1 and X-a2 of the relay switch SWR are connected to terminals 8 and 9, respectively. Accordingly, the lamp L is turned on only when either terminal X-a1 of the relay switch and terminal a2 of the manual switch SW' are electrically connected or terminal X-a2 of the relay switch and terminal a1 of the manual switch SW' are electrically connected. For example, when the connecting arm XA connects terminals X-C and X-a2 and connecting arm SA connects terminals a3 and a1, as shown in FIG. 4, the lamp L is turned on. In order to turn the lamp L off, either one of the switches SW' and SWR is actuated to change its condition.

The embodiments shown may be modified in various ways. For example, when a plurality of switches for controlling respective electric appliances are gathered in one switch box 11, they can use the same microphone 4, amplifier A2, and detector 5 in common. Furthermore, instead of employing the frequency modulation system described, the transmission of the signal can be effected by means of an amplitude modulation system, or the transmission of the signal can be effected without employing either, the control signal generated by the generating unit 1 being directly transmitted to the receiver unit 2. In this case, it is not necessary to employ the supersonic wave oscillator OSC or the detector 5. Moreover, the relay X which has been described as being a lock type can be of a revolution type.

According to the present invention, since the signal receiving unit 2 can be simply accommodated in the conventional switch box without any further connection between the switch box and the commercial AC source or between the switch box and the electric appliance, the signal receiving unit 2 can be simply applied to any electric appliance without any modification of the appliance itself.

Although the invention has been described in connection with several preferred embodiments of it, many modifications and variations will now be apparent to those skilled in the art, and it is therefore preferred that the scope of this invention be limited not by the details of the embodiments described herein, but only the appended claims.

What is claimed is:

1. A switching assembly for connecting and disconnecting an electrical appliance to a source of electrical power, comprising:

a manually operable switch coupled between said appliance and said power source and switchable between an OFF and an ON state;

a remote control switch coupled in parallel with said manually operable switch and between said appliance and said power source, said remote control switch being switchable between an OFF and an ON state, said remote control switch and said manually operable switch being connected to said appliance and said power source in such a manner that said appliance is connected to said power source whenever either of said switches is in its ON state and is disconnected from said power source when both of said switches are in their OFF state;

signal receiving means for switching said remote control switch from that one of said OFF and ON states said remote control switch was last in into the other of said OFF and ON states each time said signal receiving means receives an acoustically radiated control signal;

battery means for powering said signal receiving means; and means for coupling said power source to said battery means so as to charge said battery means whenever both said manually operable switch and said remote control switch are in said OFF state.

2. A switching assembly as claimed in claim 1, wherein said control signal is an ultrasonic signal.

3. A switching assembly according to claim 1, further including a signal generating unit including an oscillator means for generating said acoustically radiated control signal.

4. A switching assembly as claimed in claim 3, wherein said oscillator means comprises a transmitting tuning fork and a manually operable switch means electrically connected in series with said transmitting tuning fork for actuating and deactuating said oscillator means, and wherein said command signal has a frequency equal to the natural frequency of said transmitting tuning fork.

5. A switching assembly as claimed in claims 1 or 3, wherein said signal receiving means comprises:

a microphone for receiving said acoustically radiated control signal and for converting said received control signal into an electrical signal;

a receiving tuning fork coupled to said microphone, said receiving tuning fork producing a command signal when said electrical signal is applied to said receiving tuning fork; and a relay coupled to said tuning fork for switching said remote control switch from that one of said OFF and ON states which said remote control switch was last in into the other of said OFF and ON states each time said relay receives said command signal.

6. A switching assembly according to claim 3, wherein said signal generating unit includes:

oscillator means for generating said control signal, said control signal having a predetermined frequency; and acoustic transmission means for acoustically transmitting said control signal on a carrier wave which is modulated thereby.

7. A switching assembly as claimed in claim 6, wherein said oscillator means comprises a transmitting tuning fork and a manually operable switch means connected in series with said transmitting tuning fork for actuating and deactuating said oscillator means.

8. A switching assembly as claimed in claims 6 or 7, wherein said signal receiving means comprises:

a microphone for receiving said acoustically transmitted modulated carrier wave and for converting said modulated carrier wave into an electric signal;

detector means coupled to said microphone for demodulating said electric signal so as to generate a signal having a frequency equal to said predetermined frequency;

a receiving tuning fork coupled to said detector means for producing said command signal when said demodulated electric signal is applied to said receiving tuning fork; and a relay coupled to said receiving tuning fork and responsive to said command signal for switching said remote control switch from that one of said OFF and ON states said remote control switch was last in into the remaining one of said OFF and ON states each time said signal receiving tuning fork produces another said command signal.

9. A switching assembly as claimed in claim 6, wherein said transmission means comprises:

means for modulating said control signal on an ultrasonic frequency carrier wave; and speaker means for acoustically transmitting said modulated ultrasonic frequency carrier signal as said modulated carrier wave.

10. A switching assembly according to claim 1, wherein said means for coupling said power source to said battery includes a diode which is back biased and disconnects said power source from said battery whenever either of said switches are in said ON state and which is forward biased and connects said power source to said battery whenever both of said switches are in the OFF state.

11. A switching assembly according to claim 10, wherein said means for coupling said power source to said battery further includes a capacitor which is charged by said power source when both of said switches are in said OFF state and which back biases said diode due to the charge stored thereby when either of said switches are switched into said ON state.

* * * * *